United States Patent [19]

Kenning

[11] 3,769,937
[45] Nov. 6, 1973

[54] BUNK FEEDER
[75] Inventor: Joseph N. Kenning, St. Cloud, Minn.
[73] Assignee: Donald B. Voigt, St. Cloud, Minn. ; a part interest
[22] Filed: May 2, 1972
[21] Appl. No.: 249,623

[52] U.S. Cl. .............. 119/52 B, 119/56 R, 214/61, 222/166
[51] Int. Cl. ............................................. A01k 5/02
[58] Field of Search ...................... 119/51.11, 52 B, 119/56 R; 214/61; 222/164–166, 454, 457

[56] References Cited
UNITED STATES PATENTS

| | | | |
|---|---|---|---|
| 969,437 | 9/1910 | Anderson | 214/61 |
| 3,279,435 | 10/1966 | Haen | 214/61 X |
| 3,342,165 | 9/1967 | Szymanski | 214/61 X |
| 3,581,711 | 6/1971 | Bates | 119/56 R |
| 3,675,758 | 7/1972 | Buschbom et al. | 119/52 B |
| 3,695,234 | 10/1972 | Buschbom et al. | 119/52 B |

Primary Examiner—Louis G. Mancene
Assistant Examiner—J. A. Oliff
Attorney—L. Paul Burd et al.

[57] ABSTRACT

A trough is shaped to receive and carry animal feed on both sides thereof. It is supported for reciprocating movement along a feed bunker twice its length and passes back and forth under a feed discharge chute above and near the center of the feed bunker. The chute deposits feed on whichever side of the trough is uppermost on a particular pass. When an end of the trough reaches a far end of the bunker, the top side of the trough will be full of feed, and the trough will be inverted, dumping a load of feed into the bunker under the entire trough. The trough then moves back toward the other end of the bunker, receiving feed on what was until the inversion, the bottom side of the trough. When the opposite far end of the bunker is reached, the entire trough will have been loaded with feed and it will again be inverted, dropping feed in the entire remaining half of the bunker. As the trough again moves along over the bunker, it fills again and when the end is reached is unloaded again. A fractional portion of the bunker, can be serviced by shortening the length of travel of the trough in each direction before it is inverted.

10 Claims, 4 Drawing Figures

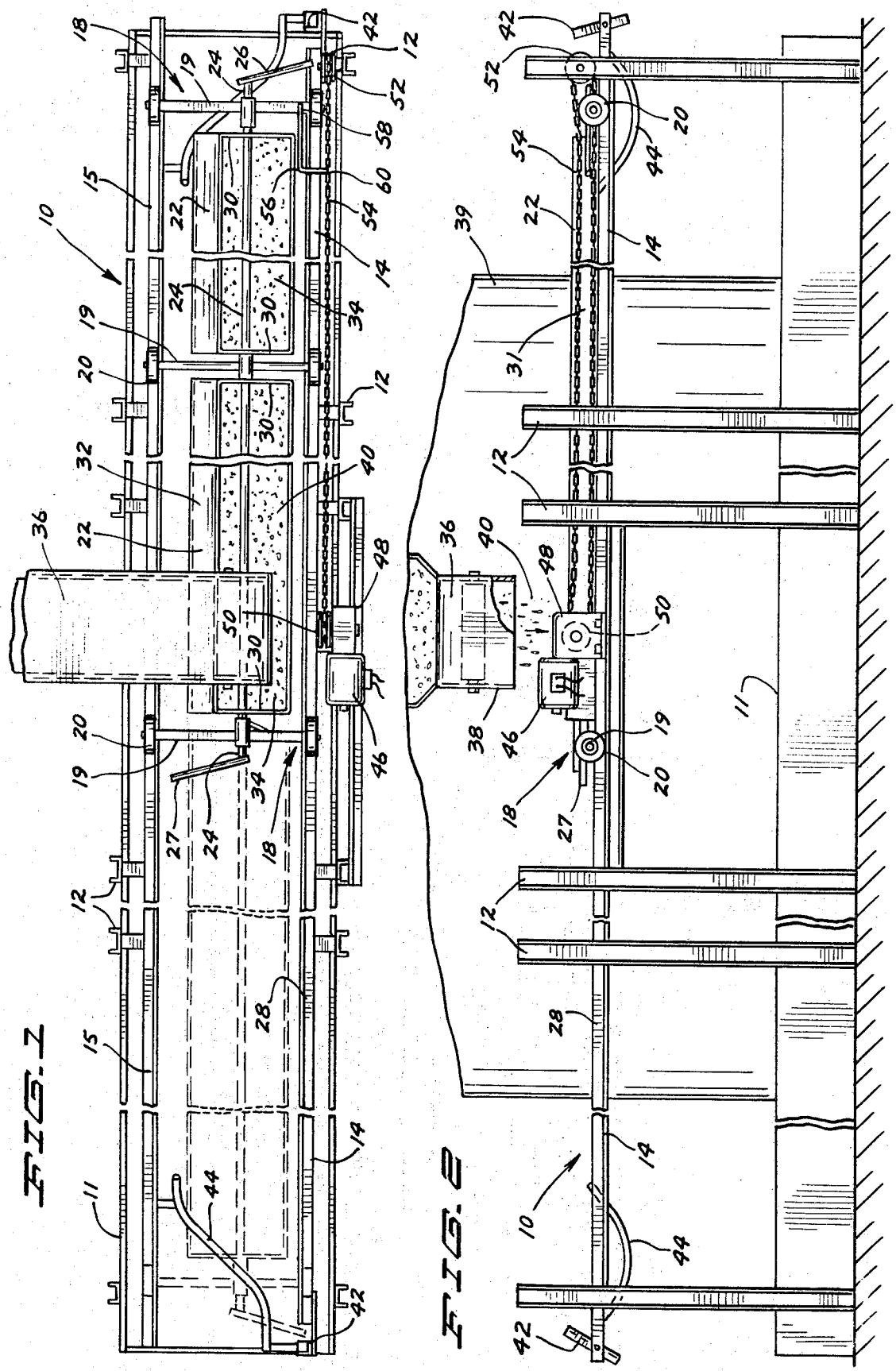

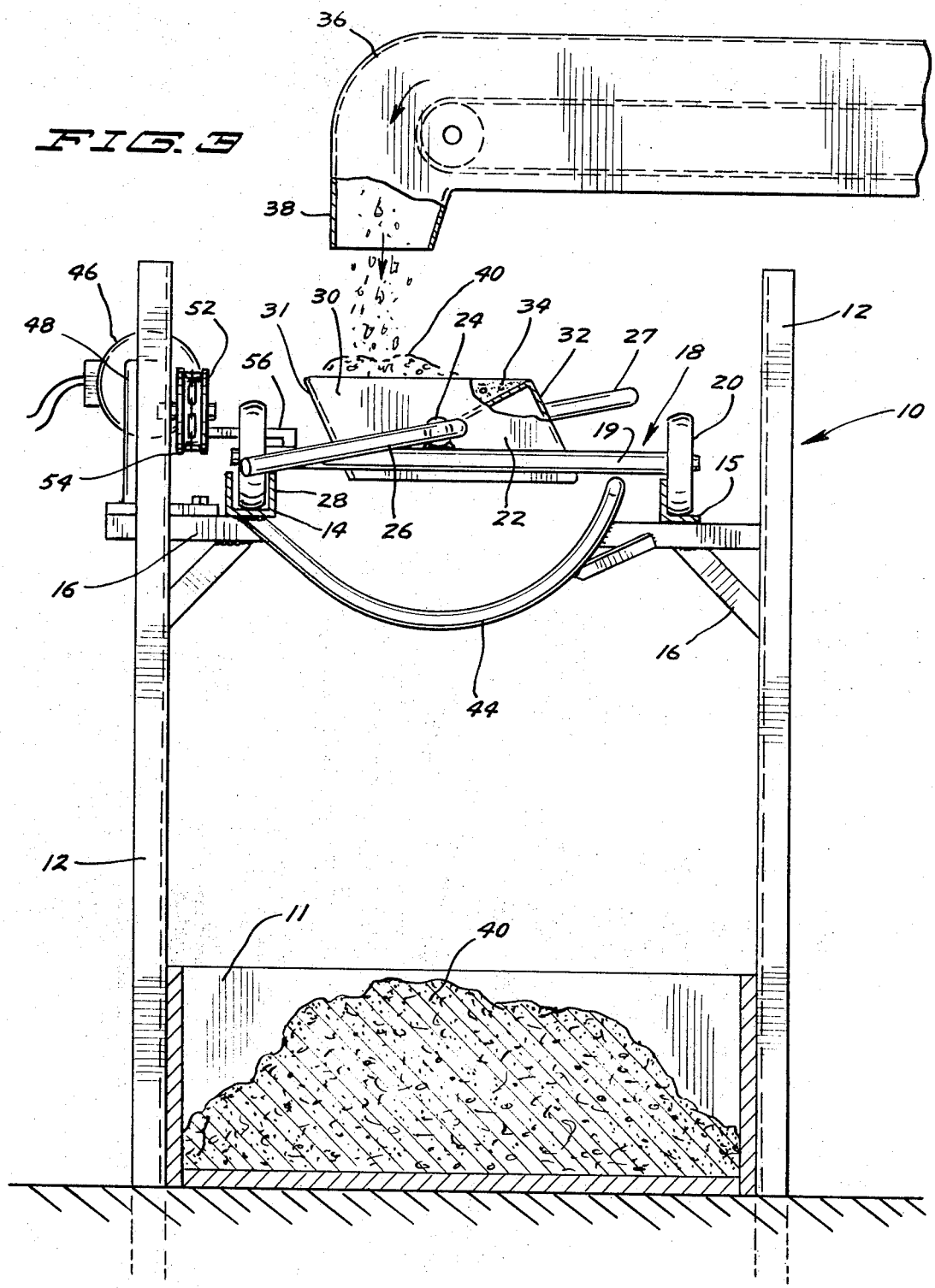

BUNK FEEDER

BACKGROUND OF THE INVENTION

This invention has relation to automatic bunk feeders whereby animal feed is deposited along the length of a feed bunker so that it can be consumed on a demand schedule by cattle in a feed lot, for example. Particularly, it is concerned with the distribution of that feed by the longitudinal movement of a feed receiving trough along and above a feed bunker, and the inverting of that trough to deliver feed to the bunker by gravity from the trough.

Automatic bunk feeders are well known, but they customarily rely on some frictional engagement of a conveying mechanism with the animal feed on or in a trough or tube. Such arrangements call for the application of a great deal of power, and are subject to jamming, blocking and clogging. This is particularly true in areas of the country where cold weather and the freezing of the moisture in the feed is a problem.

For example, see the following U.S. Pat. to Buschbom, 3,299,855; Krumheuer, 3,116,715; Reed, 3,108,572; Wolfe et al, 3,159,143; Buschbom, 3,433,204; Buschbom, 3,543,728; Haen et al, 3,279,436; and Haen et al, 3,234,913. In all of these patents, a feed auger is used to convey the feed to a trough and/or a feed bunker.

Reciprocating feed platforms or "troughs" are known, but most of them rely on some kind of frictional engagement of a scraper or pivoted flap over the trough to remove feed from the trough and deposit it in the bunker below. These structures are particularly susceptible to jamming and are particularly hard to keep in the necessary horizontal alignment so that they will work properly and completely remove all feed from the "trough" on each pass. See the U.S. Pat. No. to Ferris et al, 3,443,547; Gillette, 3,605,700; and Ferris et al, 3,581,712.

It has been proposed to dump feed into a moving V-shaped trough and when filled, to open up the trough by pivoting the panels forming the V-shape to allow the feed to fall through instantaneously. See the U.S. Pat. No. to Loesch et al, 3,217,693. In rainy or snowy weather, however, substantial amounts of feed will adhere to the panels and prevent them from closing to reform the tightly closed V-shape trough. Further, the stresses along the extensive length of the trough make it difficult, if not impossible, to maintain the panels straight enough to provide for an effective seal at the bottom of the trough. In freezing weather, unless the trough is stored in an open position, the trough will often freeze shut.

BRIEF SUMMARY OF THE INVENTION

An elongated feed bunker has supported vertically above it in spaced parallel relation, an elongated feed receiving trough or troughs not substantially longer than one-half of the length of the feed bunker. An elevator leg or other appropriate discharge chute is situated above the trough at approximately the midpoint of the feed bunker and is for the purpose of delivering feed to the current upper surface of the trough. The trough moves on a trough support frame which runs on tracks mounted above the feed bunker. The trough is pivotally mounted with respect to its frame so that it can be inverted once its outer end reaches the outer limit of the feed bunker which is to be charged with animal feed.

In one preferred embodiment of the invention, the trough is so constructed that it can hold feed on the side thereof that is uppermost during any particular pass along the length of the feed bunker and under the feed discharge chute.

IN THE DRAWINGS

FIG. 1 is a top plan view of the bunk feeder of the invention;

FIG. 2 is a front elevational view of the bunk feeder of FIG. 1;

FIG. 3 is an end elevational view of the bunk feeder of FIGS. 1 and 2 as seen from the right in those figures, with parts in section and parts broken away.

Figure 4:
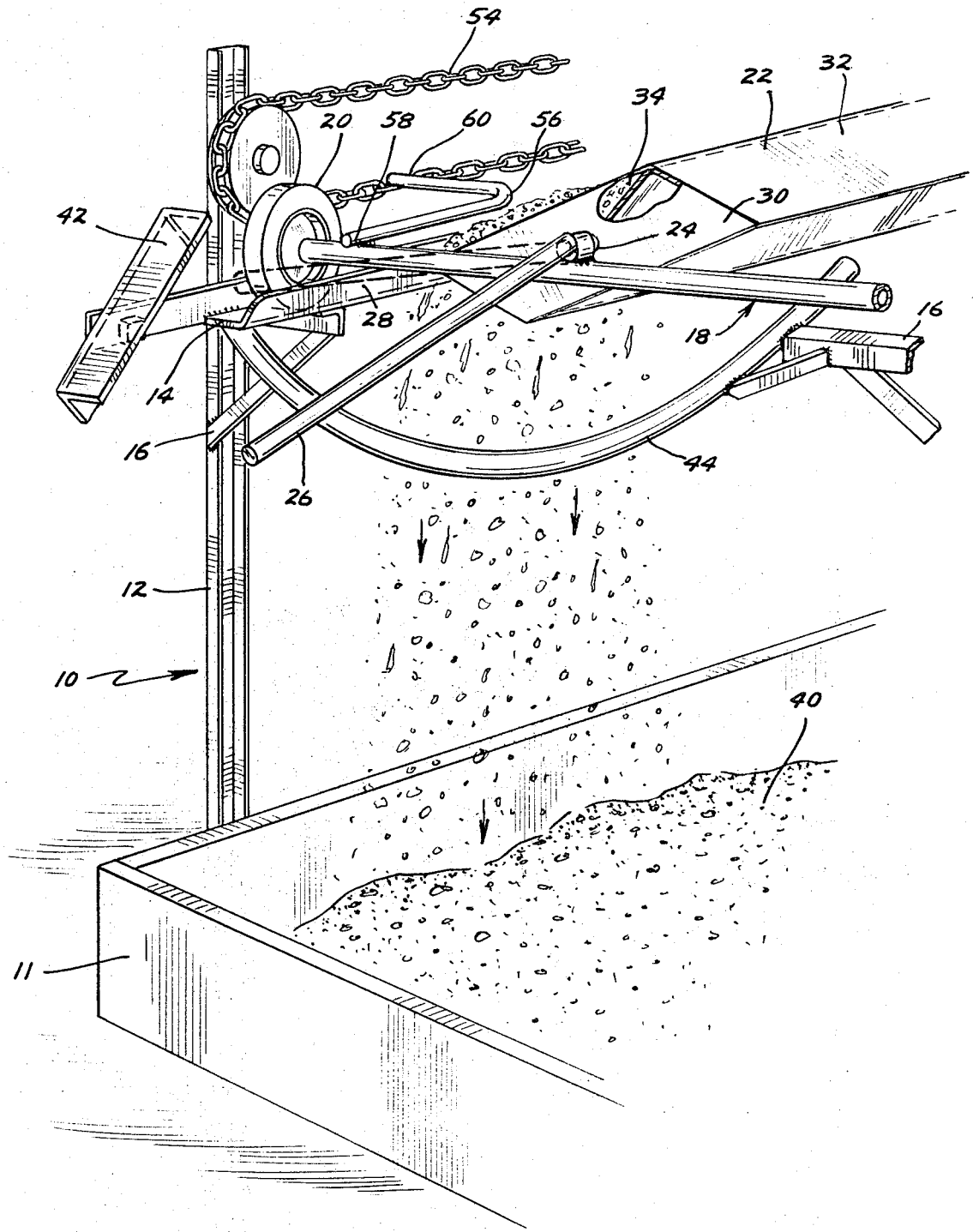
FIG. 4 is a perspective view of the end of the bunk feeder as seen in FIG. 3.

DESCRIPTION OF PREFERRED EMBODIMENT:

An elongated bunk feeder 10 includes an open feed bunker 11 supported on the ground as shown and a plurality of upright support stanchions 12 constituted as channel irons. Longitudinally extending tracks 14 and 15 are supported above the feed bunker 11 on the stanchions 12 by knee braces 16. A trough carrying frame 18 consists of a plurality of horizontal axles 19 each supporting two wheels 20, one on each of the tracks 14 and 15. Troughs 22 are pivotally supported with respect to the axles 19 on longitudinally extending trough support shaft 24. On one end of this support shaft 24 is fixedly mounted a trough stabilization and inversion bar 26, and at the other end a similar bar 27. The bar 26 on the right end of the troughs as viewed in FIG. 1 rests on the upper flange of angle iron 28 which forms one of the tracks 14, to maintain the troughs in a generally horizontal, feed receiving posture. When this stabilization bar 26 moves off of the end of the track it allows or forces the troughs 22 to invert to position stabilization bar 27 on the angle iron 28 of track 14, again stabilizing the troughs.

The troughs 22 themselves include end walls 30, longitudinally extending face walls 31 and 32, and a diagonally extending floor wall 34, extending from an upper edge of face wall 32 and a lower edge of face wall 31, as those walls and the trough are positioned in FIG. 3.

An elevator log 36 extends from a source of animal feed, such as feed storage bin or silo 39, and deposits the feed in vertical alignment above the trough through a feed discharge chute 38 at position substantially equidistance from the outer ends of the feed bunker.

As will be best seen in FIG. 3, the bulk animal feed 40 from the discharge chute 38 of the elevator leg 36 weights the trough 40 to tend to rotate it in counterclockwise direction as seen in that figure. Because of this off-center weight in the trough, the trough will rapidly invert when the stabilization bar 26 leaves the angle iron 28. However, in the event that the bunk feeder is running empty, or that the off-centered weight does not overcome the friction of the parts, an inversion bar tripping plate 42 is fixedly positioned on an extension of the track 14 in position to contact the stabilization and inversion bar 26 and force it in downward direction as the trough carrying frame 18 moves out toward the end of the feed bunker, thus forcing it below a camming arm 44 which will contact the bar and cause it and the trough to rotate to position where the trough stabilization and inversion bar 27 at the other end of the troughs will be brought into contact with the angle iron 28 of the track 14 as the troughs are reversed in direction and move back to be refilled.

This stabilization bar 27 will keep the trough from rotating even though feed is being deposited in off-center relationship on the opposite side of the floor wall 34 of the trough, until such time as that stabilization and inversion bar leaves the end of the track to allow the trough to again be inverted. A similar inversion bar tripping plate 42 is situated at that end of the bunk feeder to force the stabilization bar 27 downwardly to be contacted by a similarly positioned camming arm 44, thus again inverting the trough and putting the original stabilization and inversion bar 26 back in contact with the top of the angle iron 28 of the track 14 once again.

In order to move the troughs 22 in longitudinal direction over the feed bunker 10, a motor 46 is provided and is mounted on a platform between two of the stanchions 12. Operating through gearbox 48, the motor drives sprocket 50, chain 54 and sprocket 52. A drive arm 56 is fixedly connected to one of the axles 19 as at 58, and is connected as at 60 to the chain 54. Simple reversing controls (not shown) can be provided for reversing the direction of the chain drive. Or, as shown, the positioning of the sprockets and the connection of drive bar 56 to the chain can be such that the drive bar will move with the chain in one direction to drive the troughs in that direction until such time as the drive bar connection moves around the sprocket, thus automatically driving the drive bar and consequently the troughs in the opposite direction.

OPERATION

With the troughs at the far limit of their travel to the left in FIGS. 1 and 2, for example, the motor 46 will be activated to cause the chain 54 to drive the troughs to the right as seen in those figures. The feed which is to be distributed will be leaving the discharge chute 38 of the elevator leg 36 and falling in the then upper side of the trough 22 which is vertically below it at the time. An even load of feed will be deposited in the troughs as they move under the discharge chute, until such time as the right end of the lead trough arrives over the far right end of the feed bunker. At this point, trough stabilizing and inversion bar 26 will come clear of the angle iron 28 and the off-center positioning of the weight in the trough will cause the trough to invert about the axis of trough support shaft 24, thus depositing all of the feed from the troughs into the feed bunker over the entire length of the troughs.

The chain will drive the troughs in reverse direction and the camming arm 44, acting on the inversion bar 26, will continue the inversion of the troughs until such time as the trough stabilization and inverstion bar 27 comes in contact with angle iron 28 of thetrack 14.

As the chain drive causes the troughs 22 to be moved in direction to the left as seen in FIGS. 1 and 2, deposit of feed on the former bottom side, now top side of the trough, will begin and will continue until the troughs reach the limit of their position to the left as seen in FIG. 1, where a similar dumping action and inversion of the troughs will take place.

Should it be desirable to use less than the entire length of the feed bunker, sections of track 14 equidistant from the feed dishcarge chute on each side can be removed, and the trough will then dump and invert when the stabilizing and inversion bars reach that opening in the track. Inversion plates 42 and camming arms 44 can also be repositioned should this be desirable, and controls will be provided to reverse the direction of trough drive at the point of each trough inversion.

The embodiments of the invention in which an exclusive property or privilege is claimed are defined as follows:

1. A bunk feeder including an elongated feed bunker; an upright support structure above said bunker; a feed trough supported frame mounted above said bunker and supported on said support structure for movement along the length of the bunker, said frame being at least one half the length of said bunker; at least one feed receiving trough extending over substantially the entire length of the feed trough support frame and supported to move with the feed trough frame and pivoted thereto to move from an upright feed receiving position to an inverted position whereby feed in the trough falls by gravity from the trough into the bunker; a feed discharge chute above said trough and feed bunker, means for moving said trough under the chute to receive and retain feed therefrom; and means to move said trough from its upright, feed receiving position to its inverted position when a desired portion of said trough has been filled with feed from said chute.

2. A bunk feeder including an elongated feed bunker; an upright support structure above said bunker; a feed trough support frame mounted above the bunker and supported on said support structure for movement along the length of the bunker; at least one feed receiving trough support to move with the trough support frame and pivoted thereto to move from an upright feed receiving position to an inverted position whereby feed in the trough falls by gravity from the trough into the bunker; a feed discharge chute above said trough and feed bunker; means for moving said trough under the chute to receive and retain feed therefrom; means to move said trough from its upright, feed receiving position to its inverted position when a desired portion of said trough has been filled with feed from said chute; said trough being shaped to be capable of receiving and retaining feed thereon when in said inverter position; said discharge chute being located to discharge feed vertically above and into said trough from position substantially midway between outer ends of said feed bunker; and wherein said trough frame moves in a first direction beneath said chute with the trough in its upright feed receiving position and moves in a second opposite direction beneath said chute with the trough in its inverted feed receiving position.

3. The combination of claim 2 wherein the trough is pivoted to the trough support frame on a horizontal axis parallel with the longitudinal axis of the feed bunker.

4. The combination of claim 3 wherein said trough includes a pair of spaced, parallel end walls lying perpendicular to the longitudinal axis of the feed bunker; a pair of spaced, parallel face walls lying in parallel, spaced alignment with the longitudinal axis of the bunker, and in contiguous sealing relationship to each of the end walls; a diagonally extending floor wall extending between an upper edge of one of said face walls and a lower edge of the other face wall and in sealing relation to each of the end walls; and a longitudinally extending trough support shaft extending outwardly from said opposite, parallel end walls of said trough, said shaft being symmetrically placed with respect to said face walls and said floor wall; said trough pivoting on said shaft to move from upright to inverted position.

5. The combination of claim 4 wherein said face walls are in parallel relation to each other and each lies in a plane not perpendicular to the horizontal when the trough is in its upright position.

6. The combination as specified in claim 3 wherein said upright support structure includes first and second parallel spaced apart horizontal tracks; wherein said feed trough support frame includes a plurality of wheels at opposite sides and at least at opposite ends of the frame, and wherein said wheels are supported on said tracks.

7. The combination of claim 6 and a first trough stabilization bar fixedly mounted with respect to said trough and extending into contact with said first track when said trough is in said upright position, said first bar preventing movement of said trough out of said upright position while in contact with said first track and permitting said trough to move to inverted position when said first bar moves clear of and past the end of said first track.

8. The combination of claim 7 and a stabilization bar tripping plate fixedly mounted with respect to said upright support structure to be in alignment with said stabilization bar as it leaves the first track, said plate being positioned to force said bar in direction to cause said trough to begin to invert as said trough frame moves in said first direction.

9. The combination of claim 8 and a camming arm fixedly mounted with respect to the upright support structure in position to contact said stabilization bar after the trough has begun to invert and to move said bar in direction to cause said trough to move to inverted position as said trough support frame moves in said second direction.

10. The combination of claim 7 and a second trough stabilization bar fixedly mounted with respect to said trough and situated to come into contact with one of the tracks after said trough has moved to its inverted position, said second bar preventing movement of said trough out of said inverted position while in contact with said track and permitting said trough to move to upright position when said second bar moves clear of and past the end of said track.

\* \* \* \* \*